US009785309B2

(12) United States Patent
Lineberger

(10) Patent No.: US 9,785,309 B2
(45) Date of Patent: Oct. 10, 2017

(54) METHOD AND APPARATUS FOR PROVIDING A LAYERED WEBPAGE

(71) Applicant: SOCIALTOPIAS, LLC, Denver, NC (US)

(72) Inventor: Joshua Clinton Lineberger, Denver, NC (US)

(73) Assignee: Socialtopias, LLC, Denver, NC (US)

( * ) Notice: Subject to any disclaimer, the term of this patent is extended or adjusted under 35 U.S.C. 154(b) by 0 days.

(21) Appl. No.: 14/272,798

(22) Filed: May 8, 2014

(65) Prior Publication Data

US 2015/0324375 A1    Nov. 12, 2015

(51) Int. Cl.
| | | |
|---|---|---|
| G06F 7/04 | (2006.01) |
| H04L 29/06 | (2006.01) |
| G06F 3/00 | (2006.01) |
| G06F 3/0482 | (2013.01) |
| G06F 17/30 | (2006.01) |
| G06F 17/21 | (2006.01) |
| G06F 17/24 | (2006.01) |
| G06F 21/62 | (2013.01) |
| G06F 3/0484 | (2013.01) |

(Continued)

(52) U.S. Cl.
CPC .......... *G06F 3/0482* (2013.01); *G06F 3/0484* (2013.01); *G06F 3/04842* (2013.01); *G06F 17/212* (2013.01); *G06F 17/2229* (2013.01); *G06F 17/2247* (2013.01); *G06F 17/24* (2013.01); *G06F 17/241* (2013.01); *G06F 17/3089* (2013.01); *G06F 17/30896* (2013.01); *G06F 21/604* (2013.01); *G06F 21/62* (2013.01); *G06F 21/6245* (2013.01)

(58) Field of Classification Search
CPC .... G06F 3/0482; G06F 21/604; G06F 17/241; G06F 17/30896; G06F 17/2247; G06F 17/2229; G06F 3/0484; G06F 21/62; G06F 17/212; G06F 17/24; G06F 3/04842; G06F 17/3089; G06F 21/6245
USPC .......... 726/26; 713/151; 715/731, 732, 741, 715/762
See application file for complete search history.

(56) References Cited

U.S. PATENT DOCUMENTS

2009/0089293 A1\*  4/2009  Garritano .......... G06F 17/30713
2009/0265650 A1\*  10/2009  Canovai ................. G06Q 10/10
715/769

(Continued)

OTHER PUBLICATIONS

Canadian Office Action for corresponding Canadian Office Action No. 2,855,040 dated Nov. 25, 2010, 4 pages.

*Primary Examiner* — Aravind Moorthy
(74) *Attorney, Agent, or Firm* — Alston & Bird LLP

(57) ABSTRACT

Methods, apparatuses, and computer program products are described herein that are configured to provide a web page with one or more additional layers allowing certain functionality to be performed without having to navigate away from the web page. One example embodiment may include a method for providing a page, the page comprising a main layer and one or more additional layers, displaying the main layer and one or more indications representing the one or more additional layers, receiving a selection of at least one of the one or more indications, and displaying the at least one of the one or more additional layers in conjunction with displaying the main layer, the at least one of the one or more additional layers configured to manipulate the main layer.

60 Claims, 8 Drawing Sheets

(51) Int. Cl.
*G06F 17/22* (2006.01)
*G06F 21/60* (2013.01)

(56) References Cited

U.S. PATENT DOCUMENTS

| | | | | |
|---|---|---|---|---|
| 2010/0121773 | A1* | 5/2010 | Currier | G06F 21/577 |
| | | | | 705/347 |
| 2010/0313252 | A1* | 12/2010 | Trouw | G06F 17/3089 |
| | | | | 726/7 |
| 2011/0087764 | A1* | 4/2011 | Yaffe | G06Q 10/10 |
| | | | | 709/223 |
| 2012/0089906 | A1* | 4/2012 | Reeves | H04L 67/1095 |
| | | | | 715/255 |
| 2012/0198361 | A1* | 8/2012 | Ganimasty | G06F 17/30899 |
| | | | | 715/760 |
| 2014/0090091 | A1* | 3/2014 | Prakash | G06F 21/6272 |
| | | | | 726/30 |
| 2014/0129962 | A1 | 5/2014 | Lineberger et al. | |
| 2014/0282217 | A1* | 9/2014 | Musa | G06F 3/0481 |
| | | | | 715/781 |
| 2015/0106695 | A1* | 4/2015 | Antipa | G06F 17/2247 |
| | | | | 715/235 |

* cited by examiner

METHOD AND APPARATUS FOR PROVIDING A LAYERED WEBPAGE

TECHNOLOGICAL FIELD

Embodiments of the present invention relate generally to web page development and, more particularly, relate to a method, apparatus, and computer program product for providing a layered webpage.

BACKGROUND

Various technologies and techniques exist for web page design and development. Applicant has identified a variety of problems associated with such conventional technologies and techniques. For example, one current problem with existing website design is that conventional web pages require a user to navigate away from the page currently being viewed to another page in order to ascertain information, make alterations, or the like. In some examples, content setting, privacy settings and/or the like are only accessible after navigating away from the web page that is to be altered. Website viewers are burdened with more steps than are necessary to complete their desired task or gain their desired result on the page currently being viewed.

Through applied effort, ingenuity, and innovation, Applicant has identified various solutions to these problems that are embodied by various embodiments of the invention as herein described.

BRIEF SUMMARY

Example embodiments of the present invention provided herein include systems, methods and computer readable media for providing a page viewable through a web browser that is built to include or otherwise interactive using one or more layers. In some examples, the page may include a main layer and one or more indications associated with one or more additional selectable layers, such that when selected, the associated layer is displayed. In other examples, with each layer that is activated or deactivated, the views or layers shown on the webpage may change. Advantageously, using the layer concept described herein, users may interact with, modify or otherwise manipulate the content of a page, without navigating away from the page or while still being provided a view of the page that is be interacted with, modified or otherwise manipulated.

In one embodiment, a method may be provided, the method comprising providing a page, the page comprising a main layer and one or more additional layers, displaying the main layer and one or more indications representing the one or more additional layers, receiving a selection of at least one of the one or more indications, the at least one of the one or more indications being indicative of at least one of the one or more additional layers, and displaying the at least one of the one or more additional layers in conjunction with the main layer.

In some embodiments, the method may comprise providing an editing interface as the at least one of the one or more additional layers, and receiving edit commands, the edit commands being a function of the at least one of the one or more additional layers. In some embodiments, the method may comprise receiving an indication to close the at least one of the one or more additional layers, and implementing changes on the main layer. In some embodiments, the method may comprise reducing a visibility of the main layer when the at least one of the one or more additional layers is displayed.

In some embodiments, wherein the editing interface of the at least one of the one or more additional layers is configured to provide reporting functionality comprising at least one of a pinning functionality or a text box functionality for at least one portion of the at least one of the one or more additional layers, and wherein the receiving of the edit commands comprises receiving input of a pin placement, or receiving input of a portion of the layer, and receiving text input, and wherein the method further comprises providing notification to an intended recipient. In some embodiments, the method may comprise receiving an indication of distribution of one or more status points based on use of the reporting functionality and an accuracy of reported information.

In some embodiments, wherein the editing interface of the at least one of the one or more additional layers is configured to provide privacy or security related functionality, the method may further comprise providing a first tool configured to receive a selection of a portion of the main layer for which to apply the privacy or security related functionality, and providing a second tool configured to receive, as the edit commands, a selection of a security or privacy level. In some embodiments, the method may further comprise receiving an indication of distribution of one or more status points based on use of privacy related functionality and the selection of the portion of the main layer for which to apply the privacy related functionality.

In some embodiments, wherein the editing interface of the at least one of the one or more additional layers is configured to provide at least one of a modifying, editing, or deleting of user content functionality, the method may further comprise determining which content on the main layer is user content, accentuating the user content, receiving a selection of a portion of the user content, and receiving, as the edit commands, information instructing the modifying, editing, deleting of the selection.

In some embodiments, wherein the editing interface of the at least one of the one or more additional layers is configured to provide information or an explanatory focus functionality, the method may further comprise receiving, as the edit commands, a selection of a portion of the main layer, and displaying related information.

In some embodiments, an apparatus may be provided, the apparatus comprising at least one processor and at least one memory including computer program code, the at least one memory and the computer program code configured to, with the processor, cause the apparatus to at least display the main layer and one or more indications representing the one or more additional layers, receive a selection of at least one of the one or more indications, the at least one of the one or more indications being indicative of at least one of the one or more additional layers, and display the at least one of the one or more additional layers in conjunction with the main layer.

In some embodiments, the at least one memory and the computer program code are further configured to, with the processor, cause the apparatus to provide an editing interface as the at least one of the one or more additional layers, and receive edit commands, the edit commands being a function of the at least one of the one or more additional layers.

In some embodiments, the at least one memory and the computer program code are further configured to, with the processor, cause the apparatus to receive an indication to close the at least one of the one or more additional layers, and implement changes on the main layer. In some embodiments, the at least one memory and the computer program code are further configured to, with the processor, cause the apparatus to reduce a visibility of the main layer when the at least one of the one or more additional layers is displayed.

In some embodiments, wherein the editing interface of the at least one of the one or more additional layers is configured to provide reporting functionality comprising at least one of a pinning functionality or a text box functionality for at least one portion of the at least one of the one or more additional layers, and wherein the computer program code configured to cause the apparatus to the receive the edit commands further comprises computer program code configured to, with the processor, cause the apparatus to receive input of a pin placement, or receive input of a portion of the layer, and receive text input, and the at least one memory and the computer program code are further configured to, with the processor, cause the apparatus to provide notification to an intended recipient. In some embodiments, the at least one memory and the computer program code are further configured to, with the processor, cause the apparatus to receive an indication of distribution of one or more status points based on use of the reporting functionality and an accuracy of reported information.

In some embodiments, wherein the editing interface of the at least one of the one or more additional layers is configured to provide privacy or security related functionality, wherein the at least one memory and the computer program code are further configured to, with the processor, cause the apparatus to provide a first tool configured to receive a selection of a portion of the main layer for which to apply the privacy or security related functionality, and provide a second tool configured to receive, as the edit commands, a selection of a security or privacy level. In some embodiments, wherein the at least one memory and the computer program code are further configured to, with the processor, cause the apparatus to receive an indication of distribution of one or more status points based on use of privacy related functionality and the selection of the portion of the main layer for which to apply the privacy related functionality.

In some embodiments, wherein the editing interface of the at least one of the one or more additional layers is configured to provide at least one of a modifying, editing, or deleting of user content functionality, wherein the at least one memory and the computer program code are further configured to, with the processor, cause the apparatus to determine which content on the main layer is user content, accentuate the user content, receive a selection of a portion of the user content, and receive, as the edit commands, information instructing the modifying, editing, deleting of the selection.

In some embodiments, wherein the editing interface of the at least one of the one or more additional layers is configured to provide information or an explanatory focus functionality, wherein the at least one memory and the computer program code are further configured to, with the processor, cause the apparatus to receive, as the edit commands, a selection of a portion of the main layer, and display related information.

In some embodiments, a computer program product may be provided, the computer program product comprising at least one computer-readable storage medium having computer-executable program code instructions stored therein, the computer-executable program code instructions comprising program code instructions for providing a page, the page comprising a main layer and one or more additional layers, displaying the main layer and one or more indications representing the one or more additional layers, receiving a selection of at least one of the one or more indications, the at least one of the one or more indications being indicative of at least one of the one or more additional layers, and displaying the at least one of the one or more additional layers in conjunction with the main layer.

In some embodiments, the computer-executable program code instructions further comprise program code instructions for providing an editing interface as the at least one of the one or more additional layers, and receiving edit commands, the edit commands being a function of the at least one of the one or more additional layers.

In some embodiments, wherein the computer-executable program code instructions further comprise program code instructions for receiving an indication to close the at least one of the one or more additional layers, and implementing changes on the main layer. In some embodiments, the computer-executable program code instructions further comprise program code instructions for reducing a visibility of the main layer when the at least one of the one or more additional layers is displayed.

In some embodiments, wherein the editing interface of the at least one of the one or more additional layers is configured to provide reporting functionality comprising at least one of a pinning functionality or a text box functionality for at least one portion of the at least one of the one or more additional layers, and the computer-executable program code instructions configured for receiving of the edit commands further comprise program code instructions for receiving input of a pin placement, or receiving input of a portion of the layer, and receiving text input, and wherein the method further comprises providing notification to an intended recipient. In some embodiments, the computer-executable program code instructions further comprise program code instructions for receiving an indication of distribution of one or more status points based on use of the reporting functionality and an accuracy of reported information.

In some embodiments, wherein the editing interface of the at least one of the one or more additional layers is configured to provide privacy or security related functionality, wherein the computer-executable program code instructions further comprise program code instructions for providing a first tool configured to receive a selection of a portion of the main layer for which to apply the privacy or security related functionality, and providing a second tool configured to receive, as the edit commands, a selection of a security or privacy level. In some embodiments, the computer-executable program code instructions further comprise program code instructions for receiving an indication of distribution of one or more status points based on use of privacy related functionality and the selection of the portion of the main layer for which to apply the privacy related functionality.

In some embodiments, wherein the editing interface of the at least one of the one or more additional layers is configured to provide at least one of a modifying, editing, or deleting of user content functionality, wherein the computer-executable program code instructions further comprise program code instructions for determining which content on the main layer is user content, accentuating the user content, receiving a selection of a portion of the user content, and receiving, as the edit commands, information instructing the modifying, editing, deleting of the selection.

In some embodiments, wherein the editing interface of the at least one of the one or more additional layers is configured to provide information or an explanatory focus functionality, wherein the computer-executable program code instructions further comprise program code instructions for receiving, as the edit commands, a selection of a portion of the main layer, and displaying related information.

In some embodiments, a method is provided, the method comprising providing information to a user device, the information configured to enable display of a page, the page comprising a main layer and one or more indications representing one or more additional layers, receiving, from the user device, information indicative of a selection of at least one of the one or more indications, the at least one of the one or more indications being indicative of at least one of the one or more additional layers, and providing information configured to enable display of the at least one of the one or more additional layers indicated by the selection.

In some embodiments, the method may further comprise providing information configured to enable display of an editing interface as information configured to enable display of the at least one of the one or more additional layers indicated by the selection, receiving one or more edit commands, the edit commands being a function of the at least one of the one or more additional layers.

In some embodiments, the method may further comprise receiving information indicative of a closing of the at least one of the one or more additional layers, and implementing changes on the main layer, and providing information configured to enable display of an updated main layer. In some embodiments, the method may further comprise providing information configured to enable display of a main layer with reduced visibility when the at least one of the one or more additional layers is displayed.

In some embodiments, wherein the information configured to enable display of an editing interface is configured to provide reporting functionality comprising at least one of a pinning functionality or a text box functionality for at least one portion of the at least one of the one or more additional layers, and the receiving of the one or more edit commands comprises receiving input of a pin placement, or receiving input of a portion of the layer, and receiving text input, wherein the method further comprises providing notification to an intended recipient. In some embodiments, the method may further comprise providing an indication of distribution of one or more status points based on use of the reporting functionality and an accuracy of reported information.

In some embodiments, the method may further comprise, wherein the information configured to enable display of an editing interface is configured to provide privacy or security related functionality, providing information configured to enable display of a first tool configured to receive a selection of a portion of the main layer for which to apply the privacy or security related functionality, and providing information configured to enable display of a second tool configured to receive, as the edit commands, a selection of a security or privacy level. In some embodiments, the method may further comprise providing an indication of distribution of one or more status points based on use of privacy related functionality and the selection of the portion of the main layer for which to apply the privacy related functionality.

In some embodiments, the method may further comprise, wherein the information configured to enable display of an editing interface is configured to provide at least one of a modifying, editing, or deleting of user content functionality, determining which content on the main layer is user content, providing information configured to enable display accentuating the user content, receiving a selection of a portion of the user content, and receiving, as the edit commands, information instructing the modifying, editing, deleting of the selection.

In some embodiments, the method may further comprise, wherein the information configured to enable display of an editing interface is configured to provide information or an explanatory focus functionality, receiving, as the edit commands, a selection of a portion of the main layer, and providing related information and information configured to enable display of the related information.

In some embodiments, an apparatus may be provided, the apparatus comprising at least one processor and at least one memory including computer program code, the at least one memory and the computer program code configured to, with the processor, cause the apparatus to at least provide information to a user device, the information configured to enable display of a page, the page comprising a main layer and one or more indications representing one or more additional layers, receive, from the user device, information indicative of a selection of at least one of the one or more indications, the at least one of the one or more indications being indicative of at least one of the one or more additional layers, and provide information configured to enable display of the at least one of the one or more additional layers indicated by the selection.

In some embodiments, the at least one memory and the computer program code are further configured to, with the processor, cause the apparatus to provide information configured to enable display of an editing interface as information configured to enable display of the at least one of the one or more additional layers indicated by the selection, receive one or more edit commands, the edit commands being a function of the at least one of the one or more additional layers. In some embodiments, the at least one memory and the computer program code are further configured to, with the processor, cause the apparatus to receive information indicative of a closing of the at least one of the one or more additional layers, and implement changes on the main layer, and provide information configured to enable display of an updated main layer. In some embodiments, the at least one memory and the computer program code are further configured to, with the processor, cause the apparatus to provide information configured to enable display of a main layer with reduced visibility when the at least one of the one or more additional layers is displayed.

In some embodiments, the information configured to enable display of an editing interface is configured to provide reporting functionality comprising at least one of a pinning functionality or a text box functionality for at least one portion of the at least one of the one or more additional layers, and the computer program code configured to cause the apparatus to the receive the edit commands further comprises computer program code configured to, with the processor, cause the apparatus to receive input of a pin placement, or receive input of a portion of the layer, and receive text input, wherein the at least one memory and the computer program code are further configured to, with the processor, cause the apparatus to provide notification to an intended recipient. In some embodiments, the at least one memory and the computer program code are further configured to, with the processor, cause the apparatus to provide an indication of distribution of one or more status points based on use of the reporting functionality and an accuracy of reported information.

In some embodiments, wherein the information configured to enable display of an editing interface is configured to provide privacy or security related functionality, wherein the at least one memory and the computer program code are further configured to, with the processor, cause the apparatus to provide information configured to enable display of a first tool configured to receive a selection of a portion of the main layer for which to apply the privacy or security related functionality, and provide information configured to enable display of a second tool configured to receive, as the edit commands, a selection of a security or privacy level. In some embodiments, the at least one memory and the computer program code are further configured to, with the processor, cause the apparatus to provide an indication of distribution of one or more status points based on use of privacy related functionality and the selection of the portion of the main layer for which to apply the privacy related functionality.

In some embodiments, wherein the information configured to enable display of an editing interface is configured to provide at least one of a modifying, editing, or deleting of user content functionality, the at least one memory and the computer program code are further configured to, with the processor, cause the apparatus to determine which content on the main layer is user content, provide information configured to enable display accentuating the user content, receive a selection of a portion of the user content, and receive, as the edit commands, information instructing the modifying, editing, deleting of the selection.

In some embodiments, wherein the information configured to enable display of an editing interface is configured to provide information or an explanatory focus functionality, wherein the at least one memory and the computer program code are further configured to, with the processor, cause the apparatus to receive, as the edit commands, a selection of a portion of the main layer, and provide related information and information configured to enable display of the related information.

In some embodiments, a computer program product may be provided comprising at least one computer-readable storage medium having computer-executable program code instructions stored therein, the computer-executable program code instructions comprising program code instructions for providing information to a user device, the information configured to enable display of a page, the page comprising a main layer and one or more indications representing one or more additional layers, receiving, from the user device, information indicative of a selection of at least one of the one or more indications, the at least one of the one or more indications being indicative of at least one of the one or more additional layers, and providing information configured to enable display of the at least one of the one or more additional layers indicated by the selection.

In some embodiments, the computer-executable program code instructions further comprise program code instructions for providing information configured to enable display of an editing interface as information configured to enable display of the at least one of the one or more additional layers indicated by the selection, receiving one or more edit commands, the edit commands being a function of the at least one of the one or more additional layers.

In some embodiments, the computer-executable program code instructions further comprise program code instructions for receiving information indicative of a closing of the at least one of the one or more additional layers, and implementing changes on the main layer, and providing information configured to enable display of an updated main layer. In some embodiments, the computer-executable program code instructions further comprise program code instructions for providing information configured to enable display of a main layer with reduced visibility when the at least one of the one or more additional layers is displayed.

In some embodiments, wherein the information configured to enable display of an editing interface is configured to provide reporting functionality comprising at least one of a pinning functionality or a text box functionality for at least one portion of the at least one of the one or more additional layers, and the computer-executable program code instructions configured for receiving of the edit commands further comprise program code instructions for receiving input of a pin placement, or receiving input of a portion of the layer, and receiving text input, wherein the method further comprises providing notification to an intended recipient. In some embodiments, the computer-executable program code instructions further comprise program code instructions for providing an indication of distribution of one or more status points based on use of the reporting functionality and an accuracy of reported information.

In some embodiments, wherein the information configured to enable display of an editing interface is configured to provide privacy or security related functionality, the computer-executable program code instructions further comprise program code instructions for providing information configured to enable display of a first tool configured to receive a selection of a portion of the main layer for which to apply the privacy or security related functionality, and providing information configured to enable display of a second tool configured to receive, as the edit commands, a selection of a security or privacy level. In some embodiments, the computer-executable program code instructions further comprise program code instructions for providing an indication of distribution of one or more status points based on use of privacy related functionality and the selection of the portion of the main layer for which to apply the privacy related functionality.

In some embodiments, wherein the information configured to enable display of an editing interface is configured to provide at least one of a modifying, editing, or deleting of user content functionality, the computer-executable program code instructions further comprise program code instructions for determining which content on the main layer is user content, providing information configured to enable display accentuating the user content, receiving a selection of a portion of the user content, and receiving, as the edit commands, information instructing the modifying, editing, deleting of the selection.

In some embodiments, wherein the information configured to enable display of an editing interface is configured to provide information or an explanatory focus functionality, wherein the computer-executable program code instructions further comprise program code instructions for receiving, as the edit commands, a selection of a portion of the main layer, and providing related information and information configured to enable display of the related information.

BRIEF DESCRIPTION OF THE DRAWINGS

Figure 1:
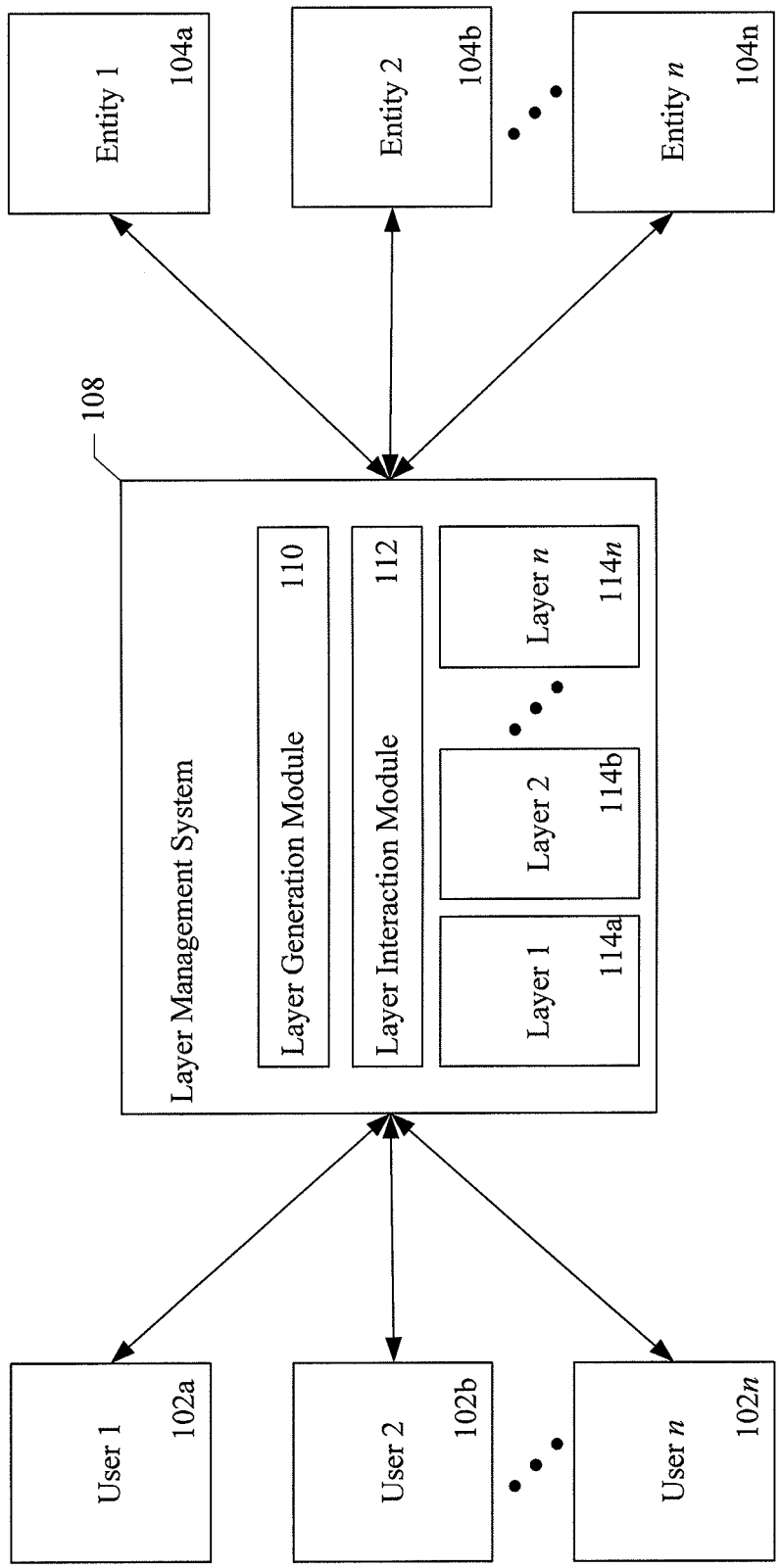
Figure 2:
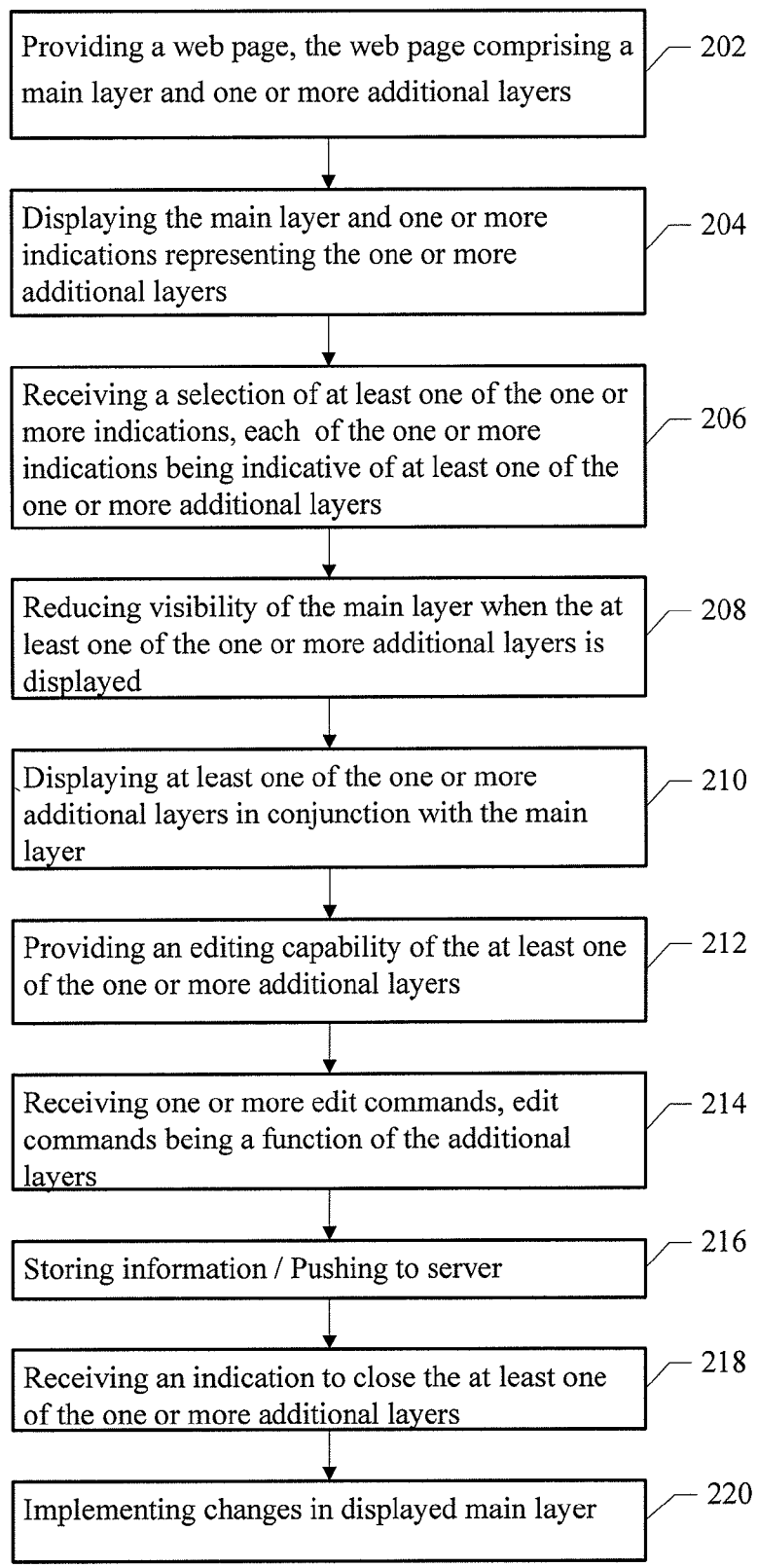
Figure 3A:
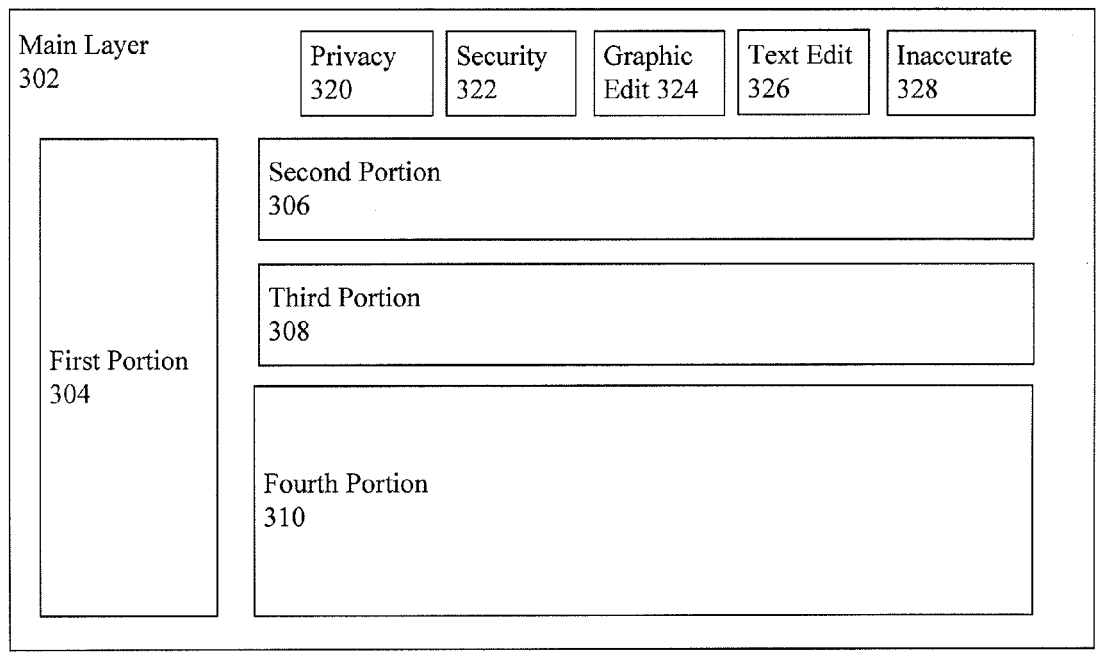
Figure 3B:
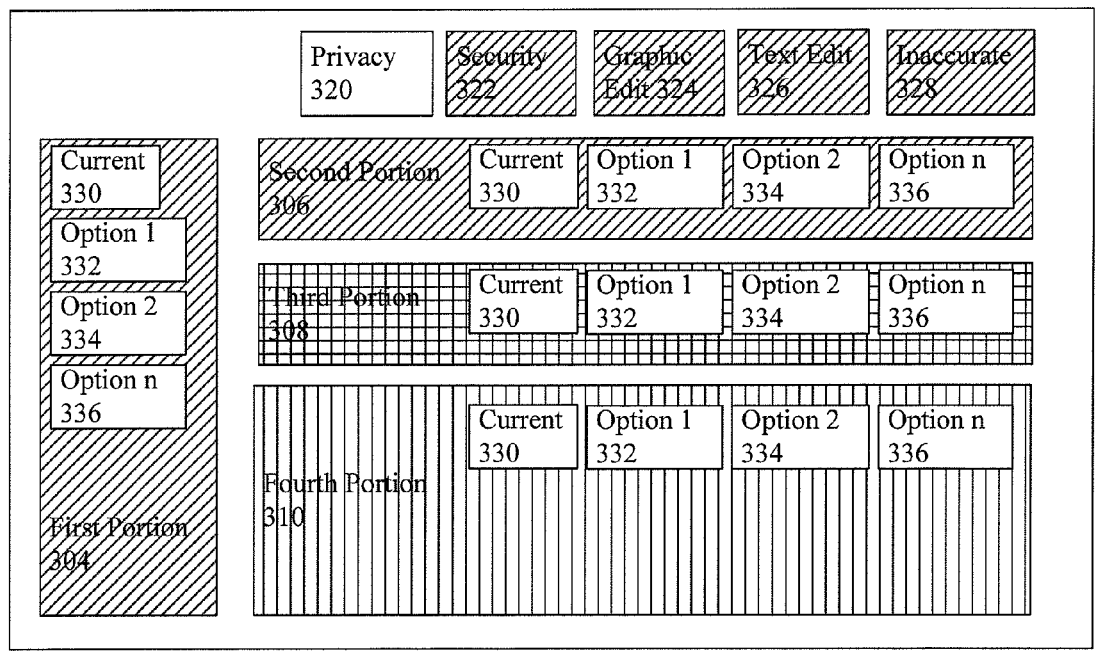
Figure 4:
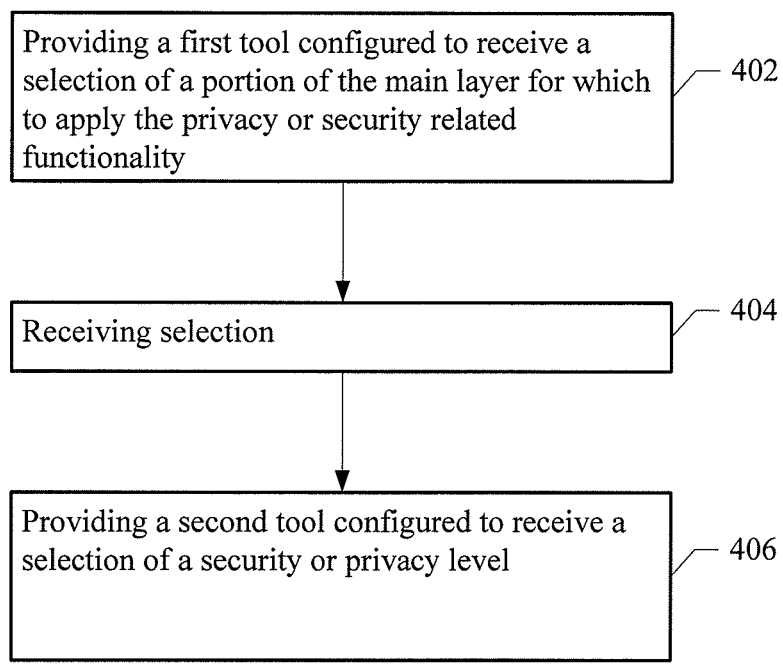
Figure 5:
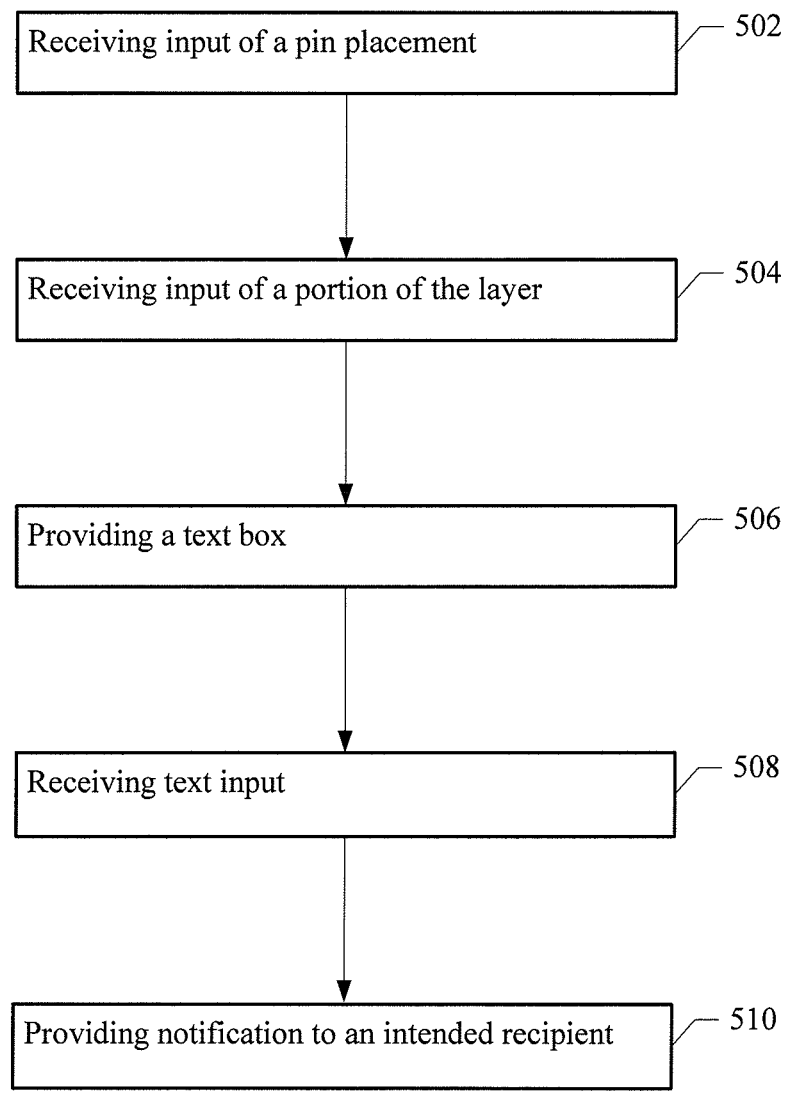
Figure 6:
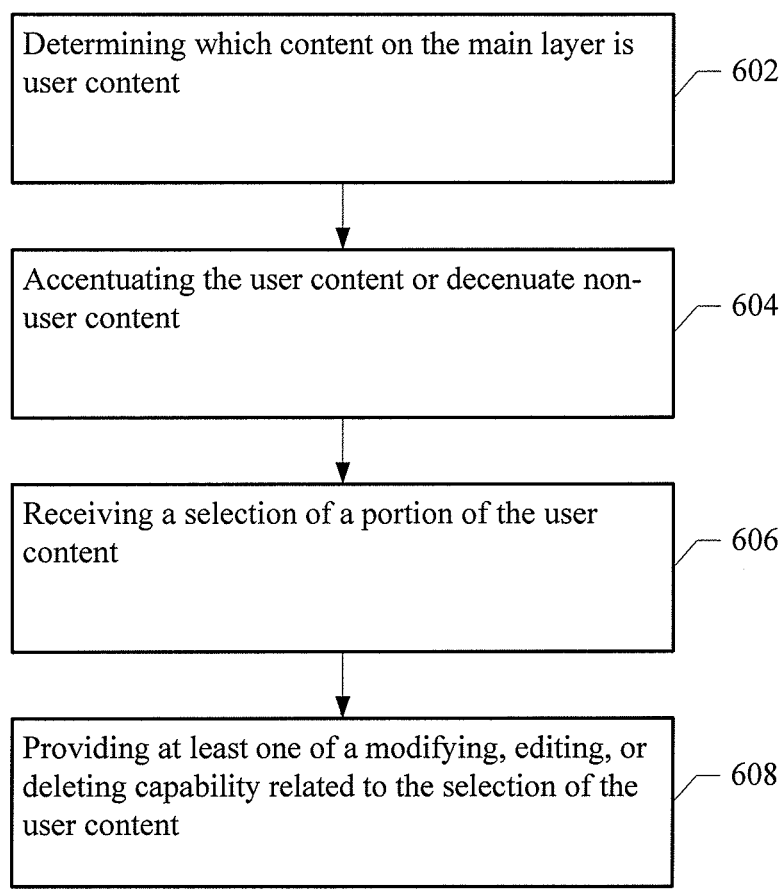
Figure 7:
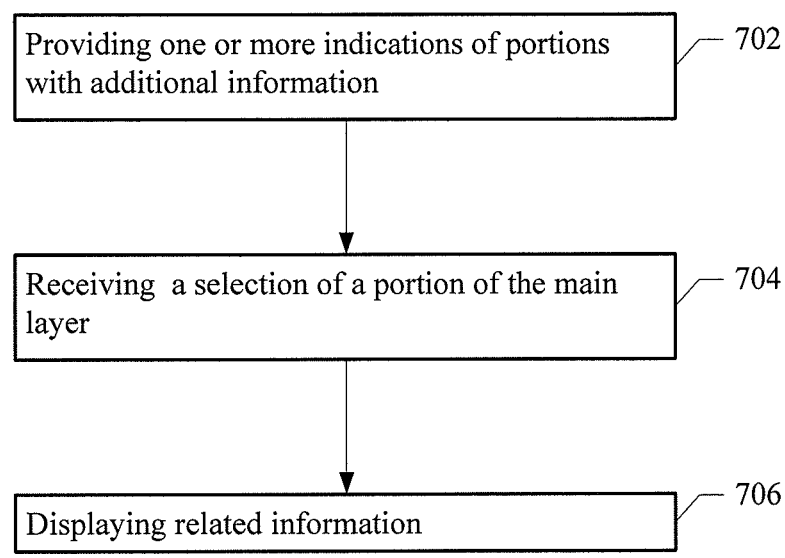
Figure 8:
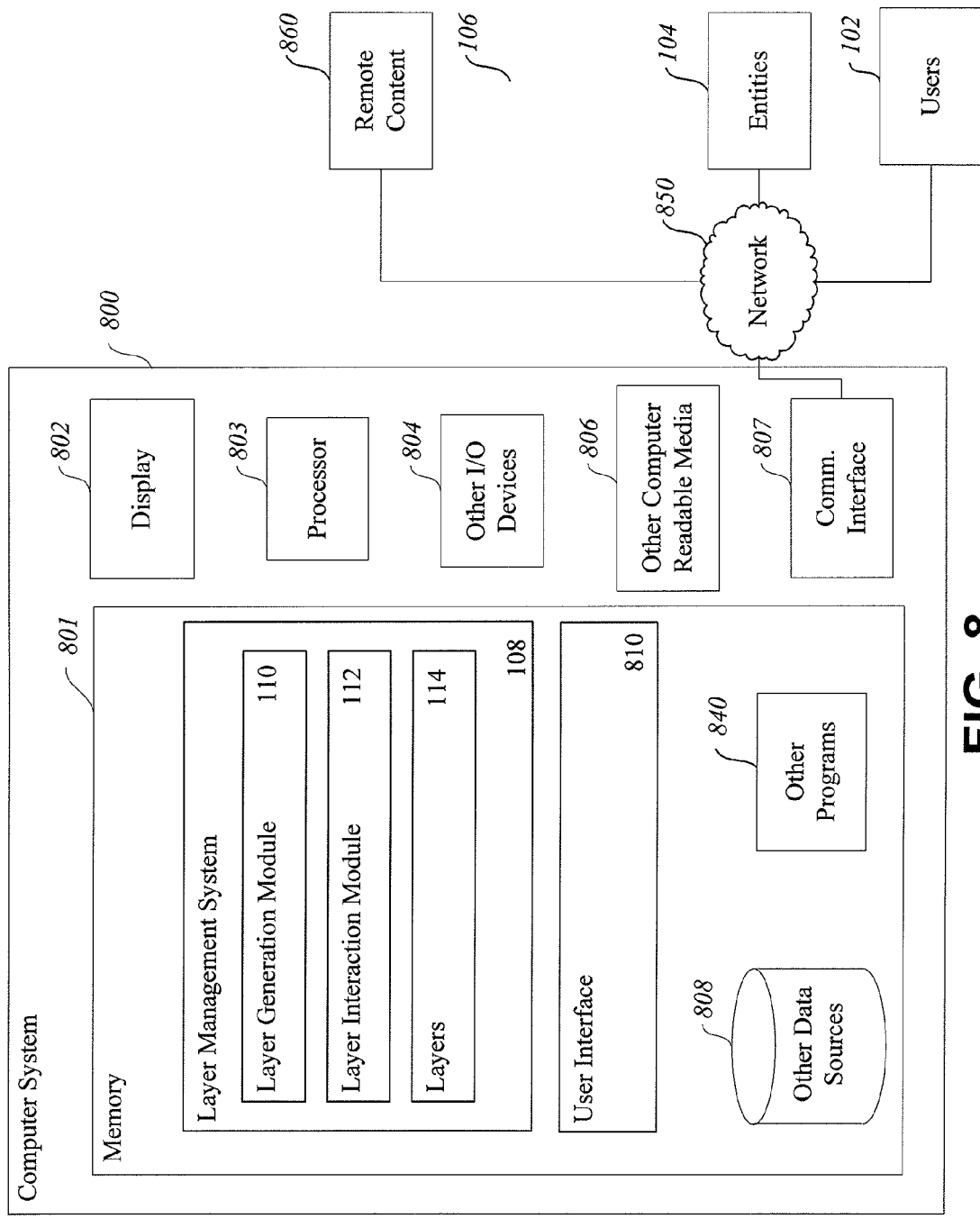

Having thus described embodiments of the invention in general terms, reference will now be made to the accompanying drawings, which are not necessarily drawn to scale, and wherein:

FIG. 1 is a schematic representation of an exemplary environment that may benefit from some example embodiments of the present invention;

FIG. 2 is a flowchart illustrating a method for providing a layered webpage in accordance with an example embodiment;

FIGS. 3A and 3B show example graphical user interface display that may be presented by various components of systems, in accordance with some embodiments FIG. 4 is a flowchart illustrating a method for providing a privacy or security layer in accordance with an example embodiment;

FIG. 5 is a flowchart illustrating a method for providing a pin placement layer in accordance with an example embodiment;

FIG. 6 is a flowchart illustrating a method for providing a user content modification layer in accordance with an example embodiment;

FIG. 7 is a flowchart illustrating a method for providing an additional information layer in accordance with an example embodiment; and FIG. 8 is a block diagram of an apparatus that may be specifically configured in accordance with an example embodiment of the present invention.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

In current examples of website navigation, users are required click or otherwise navigate from the currently viewed page to another page to ascertain information, to interact with or otherwise make alterations (e.g., privacy, content settings, etc.) to the current page being viewed. For example, to change privacy settings, a user generally has to navigate away from the particular page that the privacy settings are to be applied and may therefore forget what (e.g., content, images or the like) or who should be privacy restricted. By way of additional example, a user looking to purchase an item from an e-commerce site may be forced to navigate away from a page to enable the user to compare results or read reviews. As such, website users are burdened with more steps and webpages than should be necessary to complete their desired result or achieve their particular goal on the page being currently viewed.

Indeed, although some websites may allow user content to be edited without leaving the current page, a tool does not currently exist that allows a user to access, on the viewed page itself, all of the information on the page that is editable or is otherwise able to be user manipulated. At most current implementations allow for the setting of a zip code or some other information without navigating off of a particular page. As such, the methods, apparatus and computer program product described herein is configured to provide a platform, development kit or other tool to enable a user to select each piece of content viewable on a website individually, make edits, and then set back into place the altered content without leaving the current page through the use of one or more layers.

As such, the methods, systems and apparatus described herein may advantageously include, but is not limited to, a set of icons, user activatable buttons or the like that enable a user a user to interact with a website by activating layers related to the website. In some examples, such interaction may allow the adaptation of the content of the website, the privacy settings of the website, the various available views, the content or the like. In other examples, the layers may enable the user to interact with the website or the website manager or webmaster using push pin type text boxes, such as to facilitate accuracy of website information. In some cases, the push pin type text boxes may also enable communication between website owners/operators and one or more users. In yet further examples, layers can be used to write or otherwise display comments about certain parts of a website.

By way of further example, once a website has had a particular layer activated through the use of buttons, icons or the like, the website content may change, additional editing tools may be displayed or the like without causing a user to navigate from the page. Once the user has entered the particular layer, the user may then select certain content areas and mark the applicable privacy settings, the user may accept the relevant data ranges or other filters, the user may leave content or the like. In some cases, the user may continue to interact with the viewed layer or alternatively may select an icon to return to another a layer. As such, in some examples, the navigation around a webpage becomes streamlined and allows the user is able to continuously view the webpage being interacted with.

Exemplary System Architecture

FIG. 1 is an example block diagram of example components of an example website environment 100. In some example embodiments, the website environment 100 comprises one or more users 102*a*-102*n* and one or more entities (e.g., establishments, businesses, destinations, entertainers, promoters, etc.) 104*a*-104*n*, and/or a layer management system 108. The layer management system 108 may take the form of, for example, a code module, a component, circuitry and/or the like. The components of the example website environment 100 are configured to provide various logic (e.g., code, instructions, functions, routines and/or the like) and/or services related to the layer management system 108 and its components.

The layer management system 108 may further comprise a layer management module 110, a layer interaction module 112, and/or one or more layers 114*a*-114*n*. The layer generation module 110 is configured to provide information, to one or more users 102*a*-102*n* or user devices the information configured to enable display of a page, the page being related to, for example, the user or one or more entities 104*a*-104*n*. The page may comprise a main layer and one or more indications representing one or more additional layers. The layer management module 110 may further be configured to receive, from the user device, information indicative of a selection of at least one of the one or more indications or icons, the at least one of the one or more indications being indicative of at least one of the one or more additional layers. The layer management module 110 may further be configured to provide information configured to enable display of the at least one of the one or more additional layers indicated by the selection. In some examples, the layer generation system 110 may be further configured to provide a main (e.g., default) layer for display, whereas in other examples the layer displayed may be based on the particular user, the path the user followed to arrive at the webpage, user settings or the like. In some examples, the layer generation module 110 may be further configured to provide one or more additional layers for display. The layer interaction module 112 may be configured to enable the provision of the main layer and/or one or more additional layers. Exemplary embodiments regarding the provision of the main layer and/or one or more additional layers are further described with reference to FIG. 2.

In some embodiments, in order to provide information configured to enable display of the at least one of the one or more additional layers indicated by the selection, the layer management module 110 may be provided with information related to the interaction of one or more specific layers 114a-114n from the layer interaction module 112. Exemplary embodiments of the one or more additional layers are further described with reference to FIGS. 3a-7.

FIG. 2 illustrates an example flowchart that may be performed by, for example, the social status interaction system 108 or more generally, by any computing apparatus or system, in accordance with some example embodiments of the present invention. Generally, a web page may be provided, wherein additional functionality is accessible through the use of layers. A layer may alter a current interface of a page or display to a different interface of the page or display, which may not be accessible without the use of the layer. The layer may be configured to allow the user to alter, edit, add, view information, or the like on the current page without having to navigate away from the current page. In other examples, a layer may be presented in the foreground while demoting other content to the background. A number of exemplary additional layers will discussed below with regard to FIGS. 3a-7.

Additional layers may include, but are not limited to, for example, privacy or security functionality may be accessed or edited in one or more additional layers, a pinning or text functionality allowing the reporting or messaging of information may be provided in another one or more additional layers. A user content modification functionality may be provided in another one or more additional layers, and layer providing additional information may be provided. Indeed, in some examples, additional content may be provided in an additional layer.

FIG. 2 will be described with reference to example displays 300 and 350 shown in FIGS. 3A and 3B, respectively. FIGS. 3A and 3B show example displays 300 and 350 that may be presented by one or more display screens of one or more devices, such as those used by a first user, second user, an entity or the like. Again, while the example displays 300 and 350 are configured to be shown on a computer display, mobile device, wearable device, "tablet computer" or other device having similar dimensions, similar interfaces may be utilized with other types of devices discussed herein and modified accordingly (e.g., for screen size, input device compatibly, ease of use, etc.). And again, in some embodiments, any physical device may be configured to perform the functionalities described herein.

Turning back to FIG. 2, as shown in block 202 of FIG. 2, an apparatus, such as layer management system 108, may be configured for providing a web page. For example, a consumer may open a web browser software application running on their home computer, tablet, wearable, or mobile phone (e.g., client device) and direct the browser to a webpage associated with a social networking site or the like. In other embodiments, a consumer may execute a mobile device application associated with the social networking system on their tablet computer or mobile phone (e.g., client device). Other mobile device applications or apps may also benefit from the methods, apparatus and computer program product disclosed herein.

As shown in block 204 of FIG. 2, an apparatus, such as layer management system 108, may be configured for displaying the main layer and one or more indications representing the one or more additional layers. For example, display 300 of FIG. 3A shows a display screen that may be displayed by a device. Display 300 may be configured to display at least a main layer, and in some embodiments, one or more indications or icons 320-328 representing one or more additional layers. For example, as shown in display 300, a privacy 320 indication, a security 322 indication, a graphic edit 324 indication, a text edit 326 indication, and an inaccurate information 328 indication are shown. In other embodiments, one or more of the indications shown may not be shown and one or more additional indications not shown here may be shown. For example, indications related to pin placement, text box placement, additional information, bug reporting, status point allocation, data point allocation, user tutorials, etc. may be shown, each indicative of an additional layer.

The main layer may be a default layer. For example, when a page is loaded, the initial view is of the main layer. In some example embodiments, the main layer is the layer current being viewed or displayed. In other words, in some embodiments, a main layer may be displayed. With the main layer, one or more indications representing one or more additional layers may be displayed. Once at least one of the one or more indications is selected and an additional layer is being displayed, for the purposes of the discussion herewith, that layer may be considered the main layer relative to one or more additional layers that may be accessible from the main layer.

In some embodiments, indications representing the one or more additional layer may be displayed at the top, along the side, in a pull down menu in the main layer. As shown in block 206 of FIG. 2, an apparatus, such as layer management system 108, may be configured for receiving a selection of at least one of the one or more indications. For example, a user may click on (e.g., when using a mouse), tap (e.g., when using a touchscreen), or the like.

As shown in block 208 of FIG. 2, an apparatus, such as layer management system 108, may be configured for reducing visibility of the main layer when the at least one of the one or more additional layers is displayed. For example, the main layer may be modified such that one or more portions are displayed in a different color (e.g., faded, grey, or the color may be indicative of some information), overlapped (non-visible), moved, sized up or down, added to, subtracted from, or the like. Additionally or alternatively, in some embodiments, additional buttons, additional information or the like may be displayed with all or some portion of the information present on the main layer. For example, in a privacy embodiment, which is described in more detail below, each of or some portion of a plurality of portions of the main layer may continue to be displayed and may include one or more additional buttons related to a privacy setting. Additionally or alternatively, in some embodiments, each of or some portion of a plurality of portions of the main layer may continue to be displayed in a color associated with a current privacy setting.

As shown in block 210 of FIG. 2, an apparatus, such as layer management system 108, may be configured for displaying at least one of the one or more additional layers, the at least one of the one or more indications being indicative of the at least one of the one or more additional layers. And as shown in block 212 of FIG. 2, an apparatus, such as layer management system 108, may be configured for providing an editing interface of the at least one of the one or more additional layers. Block 212 is further described with reference to FIG. 4-7. For example, when an additional layer is selected, an interface may be displayed. The specifics of the interface are dependent on which layer was selected. Accordingly, FIGS. 4-7 detail four example functionalities provided in the editing interface of a selected additional layer.

For example, display 350 of FIG. 3A shows a display screen that may be displayed by a device. Display 350 may be configured to display one or more additional layers. Here, for example, a user may have selected a privacy layer. Display 350 may now be configured to display the privacy layer. Additionally or alternatively, display 350 may be configured to provide an editing interface for the privacy layer. Display 350 may be configured to show, in some exemplary embodiments, an indication of a current privacy setting. Here, a current setting 320 may be displayed as well as shading indicative of the current setting 320. Although both an editing interface and an indication of a current privacy setting are shown in display 350, both need not be shown. Other example embodiments may provide for one or more different indications of a current setting, such as a different color or the like.

As shown in block 214 of FIG. 2, an apparatus, such as layer management system 108, may be configured for receiving edit commands. Here, the edit commands are again dependent on the selected additional layer and are further described below. For example, selection of a privacy layer may provide the user with an interface comprising one or more privacy related choices as described in relation to block 212 and, as such, one or more received edit commands will be dependent on the provided interface. For example, continuing the privacy layer discussion related to FIGS. 3A and 3B, an edit command may be configured to change to the accessibility of one or more portions of a profile page from being able to be viewed by everyone to being able to be viewed by "friends", family, or the like. In an exemplary embodiment, display 350 of FIG. 3B shows a display screen that may be displayed by a first device. Display 350 may be configured to display "option 1", "option 2" and "option n" (e.g., indicating that any number of options may be provided). Option 1 in a privacy layer may be, as discussed above related to "friends", option 2 to "family" and so on. In other embodiments, one or more different additional layers may be provided, and as such, the edit commands may be different, displayed differently, or the like.

As shown in block 216 of FIG. 2, an apparatus, such as layer management system 108, may be configured for storing information and/or pushing the information to a server that, for example, stores the editing information. In a social media context, a server may be utilized to store information that may be used to construct a user's profile page, as well as privacy information indicative of what information particular users may view. For example, in display 350, the second portion 306, the third portion 308, and the fourth portion 310 each provide for different accessibility, and as such, in the social media context, a server may store the content of each portion and the privacy information such that each portion is only provided to the particular users indicated by that privacy information.

As shown in block 218 of FIG. 2, an apparatus, such as layer management system 108, may be configured for receiving an indication to close the at least one of the one or more additional layers and as shown in block 220 of FIG. 2, an apparatus, such as layer management system 108, may be configured for implementing changes in displayed main layer. For example, in some embodiments, the main layer may be re-displayed if, for example, content was deleted, added, or modified. In some embodiments, implementation may be invisible to the user, where for example, privacy or security settings were changed, but implementation may result in one or more other user's views of the page to be changed (e.g., where access is changed from, for example, all to "friends" or where access is removed for one or more specific persons). Again, using display 350, in an exemplary embodiment, where a user may change accessibility of one or more portions, the implementation may be invisible to the user, but particular users whose accessibility is changed, the implementation may result in them no longer seeing some content and/or now being able to view some content.

FIG. 4 shows another exemplary embodiment. Here, in order to provide a user with the ability to set privacy or security settings on a page-by-page basis by for example, selecting privacy or security related features for content on a page without having to navigate away from the page, the editing interface of the at least one of the one or more additional layers may be configured to provide privacy or security related functionality. In other words, a user may select a security or privacy layer from the main layer. The security or privacy layer may then be displayed as, for example, overlayed, and may allow selection of for example, one or more portions of the main layer and, subsequently, one or more security or privacy settings for selection.

In one example embodiment, a user may navigate to or otherwise access a profile page (e.g., a social networking profile page) and select a privacy layer. The privacy layer, upon selection, may include one or more tools that enable the selection of certain portions or sections of the page, such as, for example, personal information, status updates viewable on his/her public message board, picture uploads or the like. In some examples, the first tool may be configured to select entire sections or groups of sections. In further examples, a second tool may be used to select individual items or subsets of items within a section, such as birthdates or contact information. In operation, the one or more tools may enable one or more potential privacy settings to be illustrated (e.g., using colors such as green to signify fully public or red to signify private) as well as an indication of the current privacy setting of the section, item or the like.

One exemplary embodiment enables a user to allow a user to select varying privacy settings for different portions of each page on a social media site, of course in other examples other websites may be used. For example, on a user's profile page, the security or privacy layer may enable a user to allow access to particular portions to different people. For example, from the main layer, a user may select the privacy or security layer. The user interface then changes to display the selected layer. First, the portions of the main layer that may become selectable. In some embodiments, the portions may be displayed such that a current level of security or privacy is indicated. For example, the information portion may be a first color (e.g., green) meaning everyone has access to viewing that particular portion. Other portions (e.g., photos, contact information, or a wall) may be displayed in one or more second colors (e.g., yellow or red) indicating portions that may be blocked from the public, viewable only to connections, friends, family or the like. In some embodiments, the security or privacy layer may allow the user to customize security options by for example, individually selecting one or more connections, friends, family or the like that may have access to one or more particular portions. Once the user saves, or in some embodiments, automatically, the security or privacy settings are applied to the main layer.

As such, as shown in block 402 of FIG. 4, an apparatus, such as layer management system 108, may be configured for providing a first tool configured to receive a selection of a portion of the main layer for which to apply the privacy or security related functionality. Then, as shown in block 404 of FIG. 4, an apparatus, such as layer management system 108, may be configured for receiving selection. For example, the apparatus may be configured for receiving a selection of one or more portions of the main layer. As shown in block 406 of FIG. 4, an apparatus, such as layer management system 108, may be configured for providing a second tool configured to receive a selection of a security or privacy level. For example, the apparatus may be configured to display each of the portions of the main layer, receive a selection of one or more of the portions and then display one or more privacy or security settings that may be applied. In some embodiments, the current privacy or security setting is shown. In some embodiments, once the one or more portions are selected, the display may zoom in to the selected portions, or otherwise make those portions larger or otherwise distinguishable.

Additionally or alternatively, in some embodiments, users may be awarded, may accumulate, or otherwise may receive points (e.g., status points or the like) when they participate and/or interact with one or more layers. For example, a user may receive more points when personal information is made public (e.g., images from a previous weekend, posts, status updates or the like). For example, where a user makes some portion of their profile page, photos, personal information or the like available, points may be awarded or distributed to the user accordingly. Additional discussion of status points (e.g., user credibility score) is discussed with reference to U.S. patent application Ser. No. 13/836,727 filed Mar. 15, 2013, which is incorporated by reference as if set forth in its entirety herein.

FIG. 5 shows an example embodiment of the use of one or more of the additional layers. Here, in order to, for example, report bugs, functionality related issues, inaccurate information, or otherwise transmit or post a private message, the editing interface of the at least one of the one or more additional layers may be configured to provide a reporting functionality. Additionally or alternatively, in some embodiments, the editing interface may configured to provide at least one of a pinning functionality or a text box functionality for at least one portion of the at least one of the one or more additional layers. In other words, once this layer is selected, a user may select one or more (or in some embodiments, any) portions of the display (e.g., a photo, a photo album, a wall post or the like) and either leave a notification "pin" or text information in a text box. In some embodiments, once a portion is selected, a text box or the like may be displayed, allowing the user to leave note. The layer may allow the user to address the note to a particular person, for a particular purpose, with a particular urgency, or the like. In some embodiments, where a pin or note is directed to user, an indication of which may be messaged by any electronic medium (e.g., emailed) or an indication may appear one either the main layer of the page when they view the page or in the pin placement layer of the page when they view the pin placement layer. In examples, where the indication is transmitted to the user, the location of the pin (e.g., the portion of the page of interest) is indicated in the transmission.

In the social media context, the layer described with respect to FIG. 5 may allow a user to report functionality errors or inaccurate information. This layer may additionally or alternatively allow users to make private comments or messages about anything particular on a page. For example, when viewing the profile page of a friend, a user may make private comments regarding a picture, a group of pictures, status updates, personal information or the like.

As such, as shown in block 502 of FIG. 5, an apparatus, such as layer management system 108, may be configured for receiving input of a pin placement. Additionally or alternatively, as shown in block 504 of FIG. 5, an apparatus, such as layer management system 108, may be configured for receiving input of a portion of the layer. In some embodiments, once pin placement or a portions selection is received, as shown in block 506 of FIG. 5, an apparatus, such as layer management system 108, may be configured for providing a text box. And as shown in block 508 of FIG. 5, an apparatus, such as layer management system 108, may be configured for receiving text input. Once the user places a pin or enters text, the placement may be saved and any particular people to which the pin or message may be directed may be notified. As such, as shown in block 510 of FIG. 5, an apparatus, such as layer management system 108, may be configured for providing notification to an intended recipient. For example, in some embodiments, a "pin" may appear on the page in or within a predefined distance from the location where it was made. In some examples, such pin is viewable to an intended recipient, such as a default recipient who may be designated by the author or the page, the writer, and/or the recipient/page owner. The pin may be viewable as such until the page owner/recipient receives notification and permits the pin placement, for example, such as to facilitate accuracy of website information and/or in some cases, to enable communication between website owners/operators and one or more users.

Other exemplary embodiments, may allow a user to, for example, during beta testing, to select the pin placement layer for functionality or bug reporting in order to give the website valuable information about a functionality issue specific to a particular portion of a certain page or a particular page. Another exemplary embodiment may allow a user to select a second user's "high school information" and make a text message pin saying "my goodness, the glory days!". The second user may then be notified of this. In some embodiments, the main layer or the pin placement layer may allow the second user to respond, add text, delete, modify or make viewable to one or more other people (e.g., a third user, a group of friends, the public) by, for example, an indication on the main layer or pin placement layer of a third person. In another exemplary embodiment, if a user sees a restaurant is representing itself as "fine dining", but the user knows the restaurant is a casual diner or the like, the user may select the portion showing the inaccurate information, select a high urgency option, and pin text stating that the restaurant is really a casual dining restaurant. The website and/or the restaurant may be notified of the pin or message.

Additionally or alternatively, in some embodiments, users may be awarded, accumulate, or otherwise receive additional points when they participate. For example, points may be awarded or distributed based on accuracy of the information which is provided. For example, where a user provides information notifying a website owner that, for example, an address, phone number, description or the like is inaccurate and/or provides the correct information, points may be awarded. In some examples, points may be added at the discretion of the website owner and/or the system.

FIG. 6 shows another exemplary embodiment. Here, in order to provide a user with the ability to edit or delete, or otherwise modify existing user content on a page-by-page basis without having to navigate away from the page, the editing interface of the at least one of the one or more additional layers is configured to provide at least one of a modifying, editing, or deleting of user content functionality. For example, when a user content layer is selected, content that is not user-content may be blurred, faded or the like or the user content may be accentuated (e.g., highlighted, increased size, bolded, zoomed, or the like). The user may then be allowed to select, edit, delete, replace, or modify one or more portions of user content. User content may include pictures, status updates, photo albums, personal information or anything else that may be user may edit, delete, replace, or modify. In some embodiments, the options for modification may be determined by the type of content (e.g., pictures or personal information).

As such, as shown in block 602 of FIG. 6, an apparatus, such as layer management system 108, may be configured for determining which content on the main layer is user content. And as shown in block 604 of FIG. 6, an apparatus, such as layer management system 108, may be configured for accentuating the user content. In some embodiments, alternatively or additionally, the apparatus may be configured to shade, blur or the like any non-user content.

In some embodiments, as shown in block 606 of FIG. 6, an apparatus, such as layer management system 108, may be configured for receiving a selection of a portion of the user content. As shown in block 608 of FIG. 6, an apparatus, such as layer management system 108, may be configured for providing at least one of a modifying, editing, or deleting capability related to the selection of the user content. In some embodiments, the apparatus may first determine a type of user content and then display available modification options. Once the modification is performed, the changes may be stored.

In one exemplary embodiment, the user content layer discussed above may be configured such that, pertaining to photos, once an album is selected, zooming and/or moving the selected album (or in other embodiments, any selected content) to the center or other predetermined portion of the display. The apparatus may then be configured to allow the user to select one or more pictures and, edit the selected pictures, for example, with photo editing software capabilities (e.g., Photoshop or the like). In some embodiments, the non-selected user content may continue to be in an accentuated form while the selected user content was zoomed, centered, or otherwise moved. Once the modification is completed, the selected user content is un-zoomed, decentered, or otherwise moved back. A user may find this layer helpful due to being able to add content or edit one or more items of user content without leaving the page, instead of having to go to a "edit profile" page or "edit pictures" page or the like.

FIG. 7 shows another exemplary embodiment. Here, in order to provide a user with the ability to create or display a clean and text and information free webpage, while still providing access to information helpful or necessary to a current activity without having to navigate away from the page, the editing interface of the at least one of the one or more additional layers is configured to provide information functionality. Additionally or alternatively, the one or more layers may be configured to provide or an explanatory focus functionality. For example, once selected, this layer provides access to information related to one or more portions of the main layer. The information, though helpful or necessary, is not displayed on the main layer, allowing a cleaner page. For explanatory purposes, other exemplary layers that may be included here are (1) status point allocation (e.g., provide indications on how a user may utilize time on site/page to increase status points), (2) data collection explanation, (3) user tutorials (directions on how to create, use, or locate something seen on the page), or (4) general information regarding the page or some portion of the page (e.g., an address or location where a photo was taken, address of a restaurant mentioned or the like).

In the social media context, where a user is viewing a social activity page, and desires to know which activity he/she has made, which is adding to their status points on the website, the user may select this layer. Information related to the status points may then be displayed, allowing the user to see, in detail, the status points allocated for each of their various social activities.

In some embodiments, as shown in block 702 of FIG. 7, an apparatus, such as layer management system 108, may be configured for providing one or more indications of portions of the page comprising additional information. As shown in block 704 of FIG. 7, an apparatus, such as layer management system 108, may be configured for receiving a selection of a portion. And as shown in block 706 of FIG. 7, an apparatus, such as layer management system 108, may be configured for displaying related information. In some embodiments, once the layer is selected, all information on that layer may be displayed. For example, in the status points example above, if a status points allocation layer is selected, no additional selections may be necessary to display the desired information. In contrast, in a general information layer, the user may select one or more portions (e.g., a restaurant name on a friend's page to see the address, phone number or reviews, or a second's friend name appearing on the wall of the first friend to see their status, other connections, or the like).

FIG. 8 is an example block diagram of an example computing device for practicing embodiments of an example social status interaction system. In particular, FIG. 8 shows a computing system 800 that may be utilized to implement a website environment 100 having a layer management system 108 including, in some examples, a layer management module 110, a layer interaction module 112 and/or a user interface 810. One or more general purpose or special purpose computing systems/devices may be used to implement the layer management system 108 and/or the user interface 810. In addition, the computing system 800 may comprise one or more distinct computing systems/devices and may span distributed locations. In some example embodiments, the layer management system 108 may be configured to operate remotely via the network 850, such that one or more client devices may access the layer management system 108 via an application, webpage or the like. In other example embodiments, a pre-processing module or other module that requires heavy computational load may be configured to perform that computational load and thus may be on a remote device or server. For example, a layer management module 110 and/or a layer interaction module 112 may be accessed remotely. In other example embodiments, a user device may be configured to operate or otherwise access the layer management system 108. Furthermore, each block shown may represent one or more such blocks as appropriate to a specific example embodiment. In some cases one or more of the blocks may be combined with other blocks. Also, the layer management system 108 may be implemented in software, hardware, firmware, or in some combination to achieve the capabilities described herein.

In the example embodiment shown, computing system 800 comprises a computer memory ("memory") 801, a display 802, one or more processors 803, input/output devices 804 (e.g., keyboard, mouse, CRT or LCD display, touch screen, gesture sensing device and/or the like), other computer-readable media 806, and communications interface 807. The processor 803 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 8 as a single processor, in some embodiments the processor 803 comprises a plurality of processors. The plurality of processors may be in operative communication with each other and may be collectively configured to perform one or more functionalities of the social status interaction system as described herein.

The layer management system 108 is shown residing in memory 801. The memory 801 may comprise, for example, transitory and/or non-transitory memory, such as volatile memory, non-volatile memory, or some combination thereof. Although illustrated in FIG. 8 as a single memory, the memory 801 may comprise a plurality of memories. The plurality of memories may be embodied on a single computing device or may be distributed across a plurality of computing devices collectively configured to function as the social status interaction system. In various example embodiments, the memory 801 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In some examples, the social status interaction system 108 may be stored remotely, such that it resides in a "cloud."

In other embodiments, some portion of the contents, some or all of the components of the layer management system 108 may be stored on and/or transmitted over the other computer-readable media 806. The components of the social status interaction system 108 preferably execute on one or more processors 803 and are configured to enable operation of a social status interaction system, as described herein.

Alternatively or additionally, other code or programs 840 (e.g., an administrative interface, one or more application programming interface, a Web server, and the like) and potentially other data repositories, such as other data sources 808, also reside in the memory 801, and preferably execute on one or more processors 803. Of note, one or more of the components in FIG. 8 may not be present in any specific implementation. For example, some embodiments may not provide other computer readable media 806 or a display 802.

The layer management system 108 is further configured to provide functions such as those described with reference to FIG. 1. The layer management system 108 may interact with the network 850, via the communications interface 807, with remote content 860, such as third-party content providers, and one or more client devices operated by users 102, entities 104 and/or user groups 106. The network 850 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX, Bluetooth) that facilitate communication between remotely situated humans and/or devices. In some instances, the network 850 may take the form of the internet or may be embodied by a cellular network such as an LTE based network. In this regard, the communications interface 807 may be capable of operating with one or more air interface standards, communication protocols, modulation types, access types, and/or the like. Client devices include, but are not limited to, desktop computing systems, notebook computers, mobile phones, smart phones, personal digital assistants, tablets and/or the like. In some example embodiments, a client device may embody some or all of computing system 800.

In an example embodiment, components/modules of the social status interaction system 108 are implemented using standard programming techniques. For example, the layer management system 108 may be implemented as a "native" executable running on the processor 803, along with one or more static or dynamic libraries. In other embodiments, the layer management system 108 may be implemented as instructions processed by a virtual machine that executes as one of the other programs 840. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more monolithic programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the social status interaction system 108, such as by using one or more application programming interfaces can be made available by mechanisms such as through application programming interfaces (API) (e.g., C, C++, C#, and Java); libraries for accessing files, databases, or other data repositories; through scripting languages such as XML; or through Web servers, FTP servers, or other types of servers providing access to stored data. The data sources 808 may be implemented as one or more database systems, file systems, or any other technique for storing such information, or any combination of the above, including implementations using distributed computing techniques and may provide relevant data to the layer management system 110, the layer management module 110 and/or a layer interaction module 112. Alternatively or additionally, a layer management module 110 and/or a layer interaction module 112 may have access to local data stores but may also be configured to access data from one or more remote data sources.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the layer management system 108 may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices ("CPLDs"), and the like. Some or all of the system components and/or data structures may also be stored as contents (e.g., as executable or other machine-readable software instructions or structured data) on a computer-readable medium so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

FIGS. 2 and 4-7 illustrate example flowcharts of the operations performed by an apparatus, such as computing system 800 of FIG. 8, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 801 of an apparatus employing an embodiment of the present invention and executed by a processor 803 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 2 and 4-7, when executed, convert a computer or processing circuitry into a particular machine configured to perform an example embodiment of the present invention. Accordingly, the operations of FIGS. 2 and 4-7 define an algorithm for configuring a computer or processor, to perform an example embodiment. In some cases, a general purpose computer may be provided with an instance of the processor which performs the algorithm of FIGS. 2 and 4-7 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some example embodiments, certain ones of the operations herein may be modified or further amplified as described herein. Moreover, in some embodiments additional optional operations may also be included. It should be appreciated that each of the modifications, optional additions or amplifications described herein may be included with the operations herein either alone or in combination with any others among the features described herein.

Alternatively or additionally, the methods, apparatus and computer program products may be applied to other domains, for example manufacturing, sales, travel and/or the like. For example, a buyer may be interested in the purchase of a particular item. As such, the buyer may set his/her state to inquiring and may select his/her interest to the particular item. In response, others users, groups or entities can view this state and can provide prices and other information to allow the user to make an offer to purchase the item. The buyer may then commit to purchase the item and activation may occur when the purchase is completed.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for interacting with a web-page environment such that, through the use of one or more layers, selection of a link on an original page enables viewing new functionality associated with the link while maintaining a partial view of the original page, the method comprising:

providing the page, the page comprising a main layer and one or more additional layers;

displaying the main layer and one or more indications representing the one or more additional layers;

receiving a selection of at least one of the one or more indications; and displaying all of a plurality of portions of the main layer and the at least one of the one or more additional layers in conjunction with displaying the main layer, the at least one of the one or more additional layers configured to manipulate and receive indications enabling and subsequently enable other functionality of each of the plurality of portions of the main layer.

2. The method according to claim 1, further comprising:
providing an editing interface as the at least one of the one or more additional layers; and
receiving edit commands, the edit commands being a function of the at least one of the one or more additional layers.

3. The method according to claim 2, further comprising:
receiving an indication to close the at least one of the one or more additional layers; and
implementing changes on the main layer.

4. The method according to claim 2, wherein the editing interface of the at least one of the one or more additional layers is configured to provide reporting functionality comprising at least one of a pinning functionality or a text box functionality for at least one portion of the at least one of the one or more additional layers, and
wherein the receiving of the edit commands comprises:
receiving input of a pin placement; or
receiving input of a portion of the layer; and receiving text input.

5. The method according to claim 4, wherein the method further comprises providing notification to an intended recipient.

6. The method according to claim 2, wherein the editing interface of the at least one of the one or more additional layers is configured to provide privacy or security related functionality, the method further comprising:
providing a first tool configured to receive a selection of a portion of the main layer for which to apply the privacy or security related functionality; and
providing a second tool configured to receive, as the edit commands, a selection of a security or privacy level.

7. The method according to claim 6, further comprising:
receiving an indication of distribution of one or more status points based on use of the reporting functionality and an accuracy of reported information or use of privacy related functionality and the selection of the portion of the main layer for which to apply the privacy related functionality.

8. The method according to claim 2, wherein the editing interface of the at least one of the one or more additional layers is configured to provide at least one of a modifying, editing, or deleting of user content functionality, the method further comprising:
determining which content on the main layer is user content;
accentuating the user content;
receiving a selection of a portion of the user content; and
receiving, as the edit commands, information instructing the modifying, editing, deleting of the selection.

9. The method according to claim 2, wherein the editing interface of the at least one of the one or more additional layers is configured to provide information or an explanatory focus functionality, the method further comprising:
receiving, as the edit commands, a selection of a portion of the main layer; and
displaying related information.

10. The method according to claim 1, further comprising:
reducing a visibility of the main layer when the at least one of the one or more additional layers is displayed.

11. An apparatus for interacting with a web-page environment such that, through the use of one or more layers, selection of a link on an original page enables viewing new functionality associated with the link while maintaining a partial view of the original page, the apparatus comprising at least one processor and at least one memory including computer program code, the at least one memory and the computer program code configured to, with the processor, cause the apparatus to at least:

display a main layer and one or more indications representing the one or more additional layers;

receive a selection of at least one of the one or more indications; and display all of a plurality of portions of the main layer and the at least one of the one or more additional layers in conjunction with displaying the main layer, the at least one of the one or more additional layers configured to manipulate and receive indications enabling and subsequently enable other functionality of each of the plurality of portions of the main layer.

12. An apparatus according to claim 11, wherein the at least one memory and the computer program code are further configured to, with the processor, cause the apparatus to:
provide an editing interface as the at least one of the one or more additional layers; and
receive edit commands, the edit commands being a function of the at least one of the one or more additional layers.

13. An apparatus according to claim 12, wherein the at least one memory and the computer program code are further configured to, with the processor, cause the apparatus to:
receive an indication to close the at least one of the one or more additional layers; and
implement changes on the main layer.

14. The apparatus according to claim 12, wherein the editing interface of the at least one of the one or more additional layers is configured to provide reporting functionality comprising at least one of a pinning functionality or a text box functionality for at least one portion of the at least one of the one or more additional layers, and
wherein the computer program code configured to cause the apparatus to the receive the edit commands further comprises computer program code configured to, with the processor, cause the apparatus to:
receive input of a pin placement; or
receive input of a portion of the layer; and receive text input.

15. An apparatus according to claim 14, wherein the at least one memory and the computer program code are further configured to, with the processor, cause the apparatus to:
provide notification to an intended recipient.

16. The apparatus according to claim 12, wherein the editing interface of the at least one of the one or more additional layers is configured to provide privacy or security related functionality, wherein the at least one memory and the computer program code are further configured to, with the processor, cause the apparatus to:
provide a first tool configured to receive a selection of a portion of the main layer for which to apply the privacy or security related functionality; and
provide a second tool configured to receive, as the edit commands, a selection of a security or privacy level.

17. An apparatus according to claim 16, wherein the at least one memory and the computer program code are further configured to, with the processor, cause the apparatus to:
receive an indication of distribution of one or more status points based on use of the reporting functionality and an accuracy of reported information or use of privacy related functionality and the selection of the portion of the main layer for which to apply the privacy related functionality.

18. The apparatus according to claim 12, wherein the editing interface of the at least one of the one or more additional layers is configured to provide at least one of a modifying, editing, or deleting of user content functionality, wherein the at least one memory and the computer program code are further configured to, with the processor, cause the apparatus to:
determine which content on the main layer is user content;
accentuate the user content;
receive a selection of a portion of the user content; and
receive, as the edit commands, information instructing the modifying, editing, deleting of the selection.

19. The apparatus according to claim 12, wherein the editing interface of the at least one of the one or more additional layers is configured to provide information or an explanatory focus functionality, wherein the at least one memory and the computer program code are further configured to, with the processor, cause the apparatus to:
receive, as the edit commands, a selection of a portion of the main layer; and
display related information.

20. An apparatus according to claim 11, wherein the at least one memory and the computer program code are further configured to, with the processor, cause the apparatus to:
reduce a visibility of the main layer when the at least one of the one or more additional layers is displayed.

21. A computer program product for interacting with a web-page environment such that, through the use of one or more layers, selection of a link on an original page enables viewing new functionality associated with the link while maintaining a partial view of the original page, the computer program product comprising at least one non-transitory computer-readable storage medium having computer-executable program code instructions stored therein, the computer-executable program code instructions comprising program code instructions for:
providing a page, the page comprising a main layer and one or more additional layers;
displaying the main layer and one or more indications representing the one or more additional layers;
receiving a selection of at least one of the one or more indications; and
displaying all of a plurality of portions of the main layer and the at least one of the one or more additional layers in conjunction with displaying the main layer, the at least one of the one or more additional layers configured to manipulate and receive indications enabling and subsequently enable other functionality of each of the plurality of portions of the main layer.

22. The computer program product according to claim 21, wherein the computer-executable program code instructions further comprise program code instructions for:
providing an editing interface as the at least one of the one or more additional layers; and
receiving edit commands, the edit commands being a function of the at least one of the one or more additional layers.

23. The computer program product according to claim 22, wherein the computer-executable program code instructions further comprise program code instructions for:
receiving an indication to close the at least one of the one or more additional layers; and
implementing changes on the main layer.

24. The computer program product according to claim 22, wherein the editing interface of the at least one of the one or more additional layers is configured to provide reporting functionality comprising at least one of a pinning functionality or a text box functionality for at least one portion of the at least one of the one or more additional layers, and
wherein the computer-executable program code instructions configured for receiving of the edit commands further comprise program code instructions for:
receiving input of a pin placement; or
receiving input of a portion of the layer; and receiving text input.

25. The computer program product according to claim 24, wherein the computer-executable program code instructions further comprise program code instructions for:
providing notification to an intended recipient.

26. The computer program product according to claim 22, wherein the editing interface of the at least one of the one or more additional layers is configured to provide privacy or security related functionality, wherein the computer-executable program code instructions further comprise program code instructions for:
providing a first tool configured to receive a selection of a portion of the main layer for which to apply the privacy or security related functionality; and
providing a second tool configured to receive, as the edit commands, a selection of a security or privacy level.

27. The computer program product according to claim 26, wherein the computer-executable program code instructions further comprise program code instructions for:
receiving an indication of distribution of one or more status points based on use of the reporting functionality and an accuracy of reported information or use of privacy related functionality and the selection of the portion of the main layer for which to apply the privacy related functionality.

28. The computer program product according to claim 22, wherein the editing interface of the at least one of the one or more additional layers is configured to provide at least one of a modifying, editing, or deleting of user content functionality, wherein the computer-executable program code instructions further comprise program code instructions for:
determining which content on the main layer is user content;
accentuating the user content;
receiving a selection of a portion of the user content; and
receiving, as the edit commands, information instructing the modifying, editing, deleting of the selection.

29. The computer program product according to claim 22, wherein the editing interface of the at least one of the one or more additional layers is configured to provide information or an explanatory focus functionality, wherein the computer-executable program code instructions further comprise program code instructions for:

receiving, as the edit commands, a selection of a portion of the main layer; and displaying related information.

30. The computer program product according to claim 21, wherein the computer-executable program code instructions further comprise program code instructions for:

reducing a visibility of the main layer when the at least one of the one or more additional layers is displayed.

31. A method comprising:

providing information to a user device, the information configured to enable display of a page, the page comprising a main layer and one or more indications representing one or more additional layers, receiving, from the user device, information indicative of a selection of at least one of the one or more indications, the at least one of the one or more indications being indicative of at least one of the one or more additional layers; and providing information configured to enable display of all of a plurality of portions of the main layer and the at least one of the one or more additional layers indicated by the selection, the at least one of the one or more additional layers configured to manipulate and receive indications enabling and subsequently enable other functionality of each of the plurality of portions of the main layer.

32. The method according to claim 31, further comprising:

providing information configured to enable display of an editing interface as information configured to enable display of the at least one of the one or more additional layers indicated by the selection;

receiving one or more edit commands, the edit commands being a function of the at least one of the one or more additional layers.

33. The method according to claim 32, further comprising:

receiving information indicative of a closing of the at least one of the one or more additional layers; and implementing changes on the main layer; and providing information configured to enable display of an updated main layer.

34. The method according to claim 32, wherein the information configured to enable display of an editing interface is configured to provide reporting functionality comprising at least one of a pinning functionality or a text box functionality for at least one portion of the at least one of the one or more additional layers, and wherein the receiving of the one or more edit commands comprises:

receiving input of a pin placement; or receiving input of a portion of the layer; and receiving text input.

35. The method according to claim 34, wherein the method further comprises providing notification to an intended recipient.

36. The method according to claim 32, wherein the information configured to enable display of an editing interface is configured to provide privacy or security related functionality, the method further comprising:

providing information configured to enable display of a first tool configured to receive a selection of a portion of the main layer for which to apply the privacy or security related functionality; and providing information configured to enable display of a second tool configured to receive, as the edit commands, a selection of a security or privacy level.

37. The method according to claim 36, further comprising:

providing an indication of distribution of one or more status points based on use of the reporting functionality and an accuracy of reported information or on use of privacy related functionality and the selection of the portion of the main layer for which to apply the privacy related functionality.

38. The method according to claim 32, wherein the information configured to enable display of an editing interface is configured to provide at least one of a modifying, editing, or deleting of user content functionality, the method further comprising:

determining which content on the main layer is user content;

providing information configured to enable display accentuating the user content;

receiving a selection of a portion of the user content; and receiving, as the edit commands, information instructing the modifying, editing, deleting of the selection.

39. The method according to claim 32, wherein the information configured to enable display of an editing interface is configured to provide information or an explanatory focus functionality, the method further comprising:

receiving, as the edit commands, a selection of a portion of the main layer; and providing related information and information configured to enable display of the related information.

40. The method according to claim 31, further comprising:

providing information configured to enable display of a main layer with reduced visibility when the at least one of the one or more additional layers is displayed.

41. An apparatus comprising at least one processor and at least one memory including computer program code, the at least one memory and the computer program code configured to, with the processor, cause the apparatus to at least:

provide information to a user device, the information configured to enable display of a page, the page comprising a main layer and one or more indications representing one or more additional layers, receive, from the user device, information indicative of a selection of at least one of the one or more indications, the at least one of the one or more indications being indicative of at least one of the one or more additional layers; and provide information configured to enable display of all of a plurality of portions of the main layer and the at least one of the one or more additional layers indicated by the selection, the at least one of the one or more additional layers configured to manipulate and receive indications enabling and subsequently enable other functionality of each of the plurality of portions of the main layer.

42. An apparatus according to claim 41, wherein the at least one memory and the computer program code are further configured to, with the processor, cause the apparatus to:

provide information configured to enable display of an editing interface as information configured to enable display of the at least one of the one or more additional layers indicated by the selection;

receive one or more edit commands, the edit commands being a function of the at least one of the one or more additional layers.

43. The apparatus according to claim 42, wherein the information configured to enable display of an editing interface is configured to provide reporting functionality comprising at least one of a pinning functionality or a text box functionality for at least one portion of the at least one of the one or more additional layers, and
wherein the computer program code configured to cause the apparatus to the receive the edit commands further comprises computer program code configured to, with the processor, cause the apparatus to:
receive input of a pin placement; or
receive input of a portion of the layer; and receive text input.

44. An apparatus according to claim 43, wherein the at least one memory and the computer program code are further configured to, with the processor, cause the apparatus to:
provide notification to an intended recipient.

45. The apparatus according to claim 42, wherein the information configured to enable display of an editing interface is configured to provide privacy or security related functionality, wherein the at least one memory and the computer program code are further configured to, with the processor, cause the apparatus to:
provide information configured to enable display of a first tool configured to receive a selection of a portion of the main layer for which to apply the privacy or security related functionality; and
provide information configured to enable display of a second tool configured to receive, as the edit commands, a selection of a security or privacy level.

46. The apparatus according to claim 45, wherein the at least one memory and the computer program code are further configured to, with the processor, cause the apparatus to:
provide an indication of distribution of one or more status points based on use of the reporting functionality and an accuracy of reported information or on use of privacy related functionality and the selection of the portion of the main layer for which to apply the privacy related functionality.

47. The apparatus according to claim 42, wherein the information configured to enable display of an editing interface is configured to provide at least one of a modifying, editing, or deleting of user content functionality, wherein the at least one memory and the computer program code are further configured to, with the processor, cause the apparatus to:
determine which content on the main layer is user content;
provide information configured to enable display accentuating the user content;
receive a selection of a portion of the user content; and
receive, as the edit commands, information instructing the modifying, editing, deleting of the selection.

48. The apparatus according to claim 42, wherein the information configured to enable display of an editing interface is configured to provide information or an explanatory focus functionality, wherein the at least one memory and the computer program code are further configured to, with the processor, cause the apparatus to:
receive, as the edit commands, a selection of a portion of the main layer; and
provide related information and information configured to enable display of the related information.

49. An apparatus according to claim 41, wherein the at least one memory and the computer program code are further configured to, with the processor, cause the apparatus to:
receive information indicative of a closing of the at least one of the one or more additional layers; and
implement changes on the main layer; and
provide information configured to enable display of an updated main layer.

50. An apparatus according to claim 41, wherein the at least one memory and the computer program code are further configured to, with the processor, cause the apparatus to:
provide information configured to enable display of a main layer with reduced visibility when the at least one of the one or more additional layers is displayed.

51. A computer program product comprising at least one non-transitory computer-readable storage medium having computer-executable program code instructions stored therein, the computer-executable program code instructions comprising program code instructions for:
providing information to a user device, the information configured to enable display of a page, the page comprising a main layer and one or more indications representing one or more additional layers,
receiving, from the user device, information indicative of a selection of at least one of the one or more indications, the at least one of the one or more indications being indicative of at least one of the one or more additional layers; and
providing information configured to enable display of all of a plurality of portions of the main layer and the at least one of the one or more additional layers indicated by the selection, the at least one of the one or more additional layers configured to manipulate and receive indications enabling and subsequently enable other functionality of each of the plurality of portions of the main layer.

52. The computer program product according to claim 51, wherein the computer-executable program code instructions further comprise program code instructions for:
providing information configured to enable display of an editing interface as information configured to enable display of the at least one of the one or more additional layers indicated by the selection;
receiving one or more edit commands, the edit commands being a function of the at least one of the one or more additional layers.

53. The computer program product according to claim 52, wherein the computer-executable program code instructions further comprise program code instructions for:
receiving information indicative of a closing of the at least one of the one or more additional layers; and
implementing changes on the main layer; and
providing information configured to enable display of an updated main layer.

54. The computer program product according to claim 52, wherein the information configured to enable display of an editing interface is configured to provide reporting functionality comprising at least one of a pinning functionality or a text box functionality for at least one portion of the at least one of the one or more additional layers, and
wherein the computer-executable program code instructions configured for receiving of the edit commands further comprise program code instructions for:
receiving input of a pin placement; or receiving input of a portion of the layer; and receiving text input.

55. The computer program product according to claim 54, wherein the computer-executable program code instructions further comprise program code instructions for:
providing notification to an intended recipient.

56. The computer program product according to claim 52, wherein the information configured to enable display of an editing interface is configured to provide privacy or security related functionality, wherein the computer-executable program code instructions further comprise program code instructions for:
providing information configured to enable display of a first tool configured to receive a selection of a portion of the main layer for which to apply the privacy or security related functionality; and
providing information configured to enable display of a second tool configured to receive, as the edit commands, a selection of a security or privacy level.

57. The computer program product according to claim 56, wherein the computer-executable program code instructions further comprise program code instructions for:
providing an indication of distribution of one or more status points based on use of the reporting functionality and an accuracy of reported information or on use of privacy related functionality and the selection of the portion of the main layer for which to apply the privacy related functionality.

58. The computer program product according to claim 52, wherein the information configured to enable display of an editing interface is configured to provide at least one of a modifying, editing, or deleting of user content functionality, wherein the computer-executable program code instructions further comprise program code instructions for:
determining which content on the main layer is user content;
providing information configured to enable display accentuating the user content;
receiving a selection of a portion of the user content; and
receiving, as the edit commands, information instructing the modifying, editing, deleting of the selection.

59. The computer program product according to claim 52, wherein the information configured to enable display of an editing interface is configured to provide information or an explanatory focus functionality, wherein the computer-executable program code instructions further comprise program code instructions for:
receiving, as the edit commands, a selection of a portion of the main layer; and
providing related information and information configured to enable display of the related information.

60. The computer program product according to claim 51, wherein the computer-executable program code instructions further comprise program code instructions for:
providing information configured to enable display of a main layer with reduced visibility when the at least one of the one or more additional layers is displayed.

* * * * *